(12) United States Patent
Davidson et al.

(10) Patent No.: US 6,594,434 B1
(45) Date of Patent: Jul. 15, 2003

(54) FIBER OPTIC CABLES MANAGEMENT AND MEASUREMENT APPARATUS

(75) Inventors: Bradley Davidson, Joppa, MD (US); Reginald Bames, Jefferson, MD (US)

(73) Assignee: Ciena Corporation, Lithicum, MD (US)

( * ) Notice: Subject to any disclaimer, the term of this patent is extended or adjusted under 35 U.S.C. 154(b) by 15 days.

(21) Appl. No.: 10/051,633

(22) Filed: Oct. 26, 2001

(51) Int. Cl.[7] .............................. G02B 6/44; G02B 6/00
(52) U.S. Cl. ....................... 385/135; 385/134; 385/100; 385/114
(58) Field of Search ................................ 385/134, 135, 385/136, 100–114

(56) References Cited

U.S. PATENT DOCUMENTS

| | | | | |
|---|---|---|---|---|
| 5,066,149 A | * | 11/1991 | Wheeler et al. | 385/135 |
| 5,069,523 A | * | 12/1991 | Finzel et al. | 385/135 |
| 5,524,166 A | * | 6/1996 | Osaka et al. | 385/134 |
| 5,778,132 A | | 7/1998 | Csipkes et al. | |
| 5,799,376 A | | 9/1998 | Harsley | |
| 5,809,194 A | * | 9/1998 | Lovie | 385/104 |
| 5,850,494 A | | 12/1998 | O'Dell | |
| 5,904,037 A | * | 5/1999 | Grulick et al. | 57/264 |
| 6,079,297 A | | 6/2000 | Chandler | |
| 6,081,644 A | | 6/2000 | Stateczny et al. | |
| 6,259,851 B1 | * | 7/2001 | Daoud | 385/135 |
| 6,282,360 B1 | | 8/2001 | Milanowski et al. | |
| 6,324,331 B1 | * | 11/2001 | DeMeritt et al. | 385/134 |
| 6,424,782 B1 | * | 7/2002 | Ray | 385/135 |
| 6,496,638 B1 | * | 12/2002 | Andersen | 385/135 |
| 2002/0067900 A1 | * | 6/2002 | Mills et al. | 385/114 |
| 2002/0159746 A1 | * | 10/2002 | Howell et al. | 385/135 |

* cited by examiner

Primary Examiner—John D. Lee
Assistant Examiner—Tina M Lin
(74) Attorney, Agent, or Firm—Michael R. Cammarata; James Olsen

(57) ABSTRACT

An apparatus for managing and measuring fiber optic cable includes a mounting base for receiving and retaining a variety of fiber cassettes capable of holding optical components having fiber optic cables emanating therefrom. The apparatus includes a pair of interchangeable marking mandrels spaced from the fiber cassette and having circumferences that exceed the minimum bend radius of the fiber optic cables. Each marking mandrel has marking grooves formed on its periphery so that the fiber optic cable may be marked at a predetermined location for future splicing of the cable. The apparatus further includes fiber take up mandrels connected to the mounting base, each fiber take up mandrel having a circumference that exceeds the minimum bend radius of the fiber optic cables. The marked fiber optic cables may be temporarily wound around the circumference of the fiber take up mandrels to prevent entanglement and keep the fiber out of the operator's way while another cable is being marked. The apparatus also includes a pair of fiber retainer rails interposed between the fiber cassette and the fiber take up mandrels for guiding the fiber optic cable from the fiber cassette to the fiber take up mandrels. Each of the fiber retainer rails has a resilient rail portion that protects the fiber optic cables from damage.

24 Claims, 3 Drawing Sheets

FIBER OPTIC CABLES MANAGEMENT AND MEASUREMENT APPARATUS

BACKGROUND OF THE INVENTION

A. Field of the Invention

The present invention relates generally to the communications field, and, more particularly to an apparatus for managing and measuring fiber optic cables, and a method for managing and measuring fiber optic cables using the same.

B. Description of the Related Art

Along with the increasing prominence of the Internet has come the wide-ranging demand for increased communications capabilities, including more channels and greater bandwidth per channel. Optical media, such as fiber optic cables, promise an economical alternative to electrical conductors for high-bandwidth long-distance communications. As described in U.S. Pat. No. 6,079,297, assigned to the assignee of the present application, CIENA Corporation, a typical fiber optic cable consists of a silica glass core region that provides a path for optical signals traveling along the cable. The core region is surrounded by a cladding region whose refractive index may be altered to achieve a desired propagation path of the optical signals traveling along the core region. The cladding region is in turn surrounded by an outer protective coating to protect the core region and the cladding region from damage, such as nicks, scratches or dents, which could degrade the long term quality and performance of the fiber optic cable. A fiber optic cable is also protected by a buffer layer that is typically a firm polymer which provides increased protection to the fiber while also increasing the fiber bending stiffness. The buffer layer is formed directly around the protective coating and there is usually a significant adhesive force between the buffer layer and the protective coating.

The glass optical fibers of fiber optic cables have very small diameters, which are susceptible to external influences such as mechanical stress and environmental conditions. The index of refraction of the core is higher than the index of refraction of the cladding to promote internal reflection of light propagating down the core.

Furthermore, the glass fibers in such cables are easily damaged when bent too sharply and require a minimum bend radius to operate within required performance specifications. Damaged fiber optic cables may lead to a reduction in the signal transmission quality of the cables. Accordingly, fiber optic cables are evaluated to determine their minimum bend radius. As long as a fiber optic cable is bent at a radius that is equal to or greater than the minimum bend radius, there should be no reduction in the transmission quality of the cable. If a fiber optic cable is bent at a radius below the minimum bend radius determined for such cable, there is a potential for a reduction in signal transmission quality through the bend. The greater a fiber optic cable is bent below its minimum bend radius, the greater the potential for breaking the fiber(s) contained in the cable, and the shorter the life span of the cable.

Certain uses of fiber optic cables require that a portion of the buffer layer be removed from the fiber optic cable. For example, to make a fiber optic coupler, the buffer layers are stripped from portions of at least two fiber optic cables, and the stripped portions are fused (spliced) together in side-by-side relationship and stretched. It is important that the stripped portions of the fiber optic cables do not become weakened during the stripping process since weakened fiber optic cables can fail during subsequent process steps or during handling of the coupler when tensile stress is applied to the exposed glass optical fiber.

A buffer layer of a fiber optic cable may be removed or stripped in a variety of ways. Buffer layers can be mechanically stripped from an optical fiber by placing the fiber within a precision linear stripper as disclosed in U.S. Pat. No. 6,079,297, discussed above, bringing blades of the stripper into contact with opposite sides of the buffer layer, and then moving the tool relative to the axis of the buffer layer. The bare portion of the fiber usually needs to be wiped with a cloth wetted with alcohol or the like to remove smudges and/or particles of buffer layer that have been deposited on the bare portion of optical fiber by the buffer layer removal process. This type of buffer layer removal process has been built into equipment that performs the tasks of the technician, whereby the process may no be longer manual.

Fiber optic cables are prepared prior to splicing to another fiber optic cable, or joining to a terminating device, by cleaving the fiber to obtain a high-quality endface. In order to obtain low optical losses, the endface of the fiber must be substantially flat and without flaws. In addition to endface quality, one parameter of importance is the angle of the endface to the optical axis of the optical fiber. It is desirable that the plane of the endface be normal to the optical axis, with the fracture angle measuring deviation from the normal.

When the fiber optic cables of two optical components are to be joined or spliced, the end portions of the buffer layers of the fiber optic cables need to be removed. The end portions of the fiber optic cables also need to be cleaved to form endfaces. Typically, the endfaces are formed a predetermined distance from the optical components, by measuring the predetermined distance from the optical component. The endfaces of the cables may then be fusion spliced together. As used herein, the term "splice" refers to the assembly of a fused joint of fiber optic cables, and, generally, although not necessarily, a reinforcing bar and a protective sheath (also known as a splice protector).

The optical components may then be installed in an optical communications circuit. Typically, the fused fiber optic cables joining the two optical components are routed, bent, and/or stored in the optical communications circuit. The joined fiber optic cables may be wrapped around two storage mandrels, providing straight and bent portions of the joined fiber optic cables. Therefore, the splice joining the two cables is preferably formed at a portion of the cables that is not bent when the spliced cables are routed, bent, or stored in the circuit. That is, the splice is preferably formed at straight portions of the joined fiber optic cables. When the splice of the joined fiber optic cables is located a straight portion, the splice is subjected to less mechanical stresses than would occur if it were formed at a bent portion.

Since there is typically excess fiber optic cable when the two optical components are spliced, the predetermined distance for forming the endfaces of the cables may occur at multiple points along the lengths of the fiber optic cables. This is fortunate since the cleaving and splicing of fiber optic cables is not always successful.

When the cleaving or splicing of fiber optic cables is unsuccessful, additional lengths of the fiber optic cable buffer layer may need to be removed, and predetermined distances from the optical components for the locations of the endfaces must be measured. The new predetermined distances preferably will occur at a portion of the cables that is not bent when they are routed, bent, or stored in the circuit. Currently, the measurement of the predetermined distances is manually performed by measuring, with a ruler, the distance from the optical components to the desired location of the endfaces. This measurement is cumbersome and time consuming.

In addition, multiple optical fibers or optical devices must be connected via splicing to pieces of terminal equipment, such as optical transmitters and optical receivers, to create functioning optical systems. Present day optical fiber splicing operations require numerous steps, including stripping, cleaning, cleaving, aligning, splicing, recoating, and pull-testing. While each of the individual steps can be performed somewhat quickly, the set-up, preparation and transfer time between the steps of the splicing process consumes a significant amount of time. Also, each of the steps is generally performed manually on a different apparatus or piece of manufacturing equipment. In addition, nearly all the set-up and preparation is performed manually, thereby increasing not only the amount of time for the process, but the possibility of human errors as well.

Therefore, during interconnection of multiple optical components, the optical components are typically mounted in a fiber cassette or organizer so that they may be spliced together. Typically, one or more fiber optic cables emanate from each optical component, increasing the complexity of the arrangement of the optical components, which, in turn, increases the need for more splices. The multiple fiber optic cables in this arrangement generate a web of cables that may confuse the operator charged with the task of splicing optical components together. This increases the chance that the operator will incorrectly splice two optical components together. Incorrectly spliced optical components may damage or destroy the optical components, if the error is not corrected. Correction of an incorrect splice costs valuable manufacturing time and resources.

Accordingly, there exists a need in the art for an apparatus that can measure predetermined points on the fiber optic cable that may be used as splice points, and facilitate the handling of fiber optic cables during an optical fiber interconnection process, whether through a fusion process or a connectorization process. Such an apparatus would reduce the amount of manual intervention by an operator during the process steps and thereby increase the quantity and uniformity of the fiber optic cable and optical devices manufactured through the interconnection process.

SUMMARY OF THE INVENTION

The present invention the needs of the related art by providing an apparatus that manages the multitude of fiber optic cables emanating from optic components contained in a fiber cassette, and measures predetermined splice points on the stripped portions of the cables. The apparatus of the present invention may be used in a method for managing and measuring fiber optic cables.

In accordance with the purpose of the invention, as embodied and broadly described herein, the invention comprises an apparatus for managing and measuring fiber optic cable, comprising: a mounting base for receiving and retaining a fiber cassette capable of holding at least one optical component having at least one fiber optic cable emanating therefrom; a fiber take up mandrel connected to said mounting base and having a circumference that exceeds the minimum bend radius of the fiber optic cable, wherein the fiber optic cable may be wound around the circumference of said fiber take up mandrel for temporary storage thereon; a fiber retainer rail connected to said mounting base and interposed between the fiber cassette and said fiber take up mandrel, said fiber retainer rail guiding the fiber optic cable from the fiber cassette to said fiber take up mandrel; and a marking mandrel spaced from the fiber cassette and having a circumference that exceeds the minimum bend radius of the fiber optic cable, said marking mandrel having a marking groove formed on its periphery so that the fiber optic cable may be marked at a predetermined location.

Further in accordance with the purpose of the invention, as embodied and broadly described herein, the invention comprises a method for managing and measuring a fiber optic cable with an apparatus having a mounting base for receiving and retaining a fiber cassette, a fiber take up mandrel connected to the mounting base and having a circumference that exceeds the minimum bend radius of the fiber optic cable, a fiber retainer rail connected to the mounting base and interposed between the fiber cassette and the fiber take up mandrel, and a marking mandrel spaced from the fiber cassette and having a circumference that exceeds the minimum bend radius of the fiber optic cable, comprising: mounting an optical component having at least one fiber optic cable emanating therefrom in the fiber cassette; wrapping a portion of the fiber optic cable around the marking mandrel; marking a predetermined location of the fiber optic cable using a marking groove formed on the periphery of the marking mandrel; and wrapping the marked fiber optic cable on the fiber take up mandrel for temporary storage thereon.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF EMBODIMENTS OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices.

The terms "optical component" or "optical components" refer to any device capable of being used in optical communications equipment. For example, the optical components capable of being used with the present invention include, but are not limited to, optical amplifiers (e.g., semiconductor optical amplifiers, Raman amplifiers, erbium-doped fiber amplifier, praseodymium-doped fluoride amplifiers, telluride-based erbium-doped optical amplifiers, and planar waveguide optical amplifiers), optical emitters (e.g., light-emitting diodes, laser diodes, etc.), and optical detectors (e.g., PIN photodiodes, avalanche photodiodes, etc.).

Figure 1:
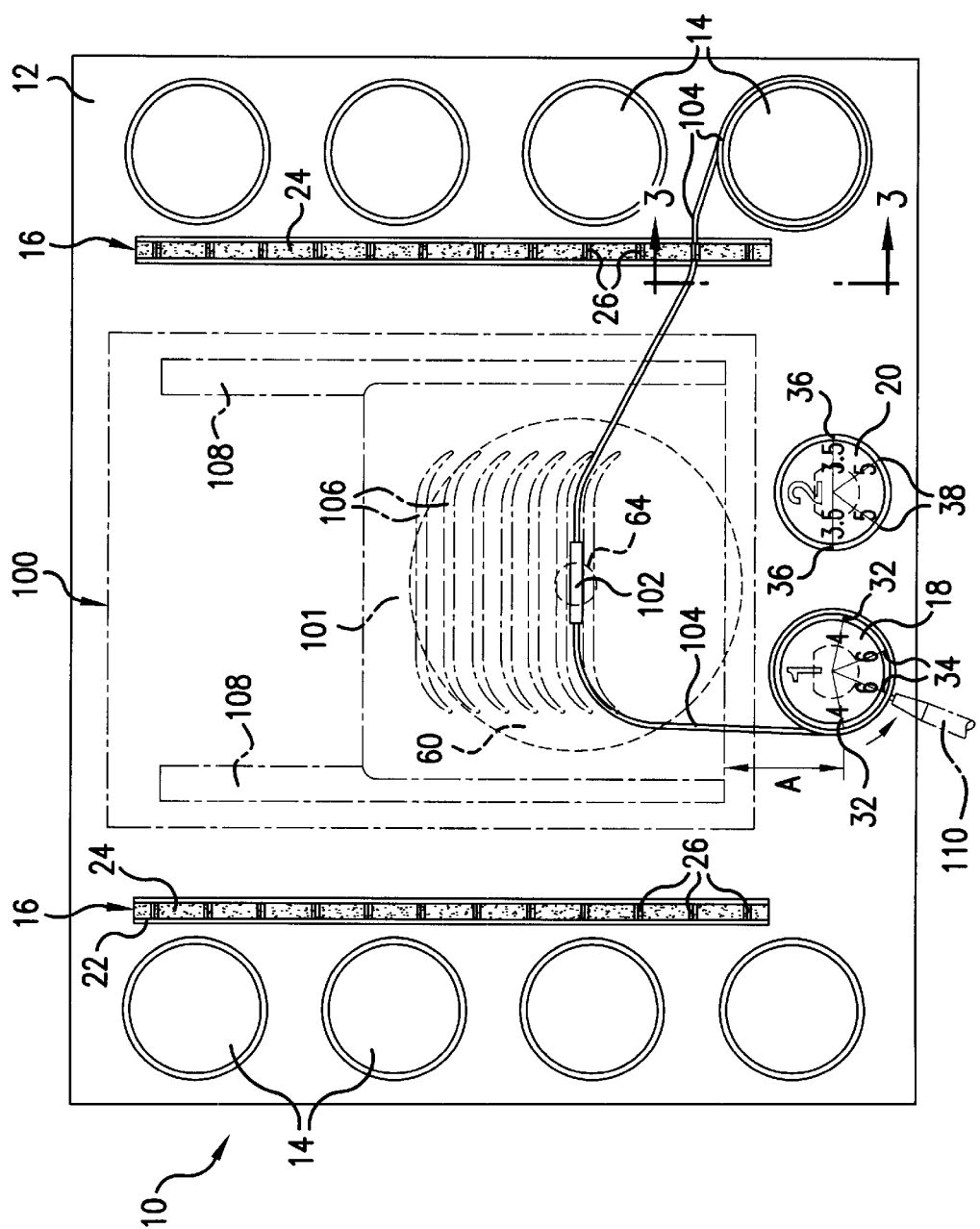
FIG. 1 is top plan view of an apparatus for managing and measuring fiber optic cables in accordance with an embodiment of the present invention.

Referring now specifically to the drawings, an apparatus for managing and measuring fiber optic cables according to the present invention is illustrated in FIG. 1, and shown generally as reference numeral 10. The managing and measuring apparatus 10 includes a mounting base 12 that supports a variety of fiber cassettes 101, a multitude of fiber take up mandrels 14, fiber retainer rails 16, and a pair of marking mandrels 18, 20.

Mounting base 12 may be provided on a workbench or other similar work station, and may have a plurality of feet that support base 12. Mounting base 12 may be made from a variety of materials, but preferably is made from stainless steel, and more preferably from an anodized aluminum.

Figure 4:
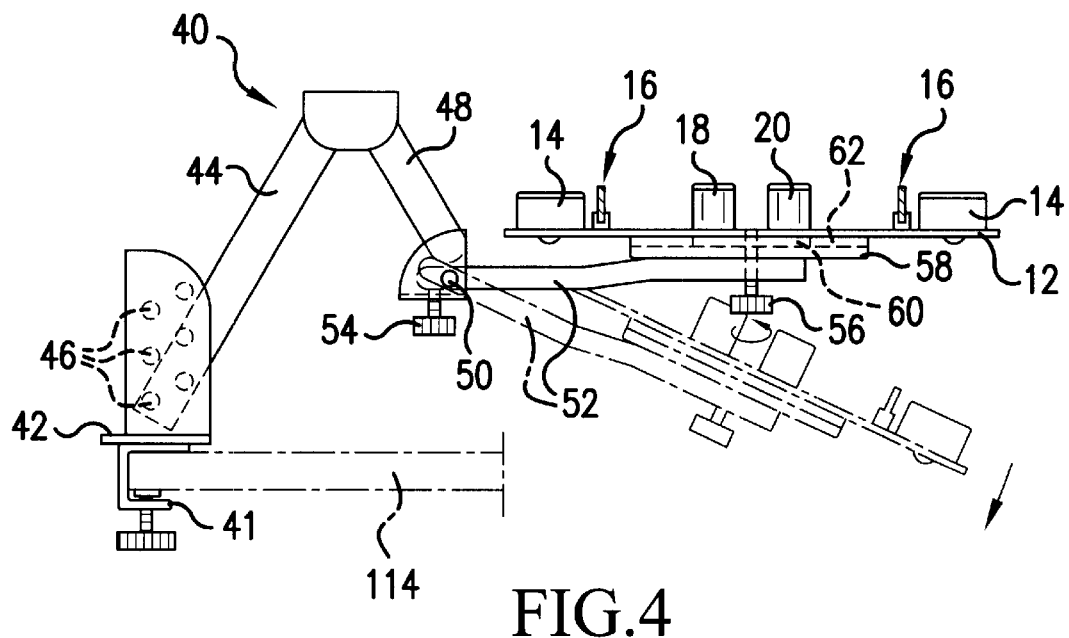
FIG. 4 is a side elevational view of an articulating arm assembly useful with the apparatus for managing and measuring fiber optic cables shown in FIG. 1.

Alternatively, mounting base 12 may connect to an articulating arm assembly 40 as shown in FIG. 4. Articulating arm assembly 40 enables apparatus to be maneuvered in a variety of directions, including the x, y, and z directions. Assembly 40 includes a C-clamp 41 that may attach to a work surface 114 such as a bench top, and a pivotal base 42 attached to the C-clamp 41 that allows assembly 40 to swivel. Pivotal base 42 attaches to an adjustable vertical arm 44 via a multitude of mount holes 46 provided in base 42. Adjustable vertical arm 44 connects to a forward support arm 48, which pivotally connects to a cantilevered arm 52, via a pivot 50. A tilt adjustment screw 54 cooperates with pivot 50 to enable cantilevered arm 54 to be tilted up and down (as shown in phantom outline). The cantilevered arm 54 connects to a tray 58, a bearing plate 60 having a recess 62, and mounting base 12 via a retainer screw 56 provided through a hole 64 provided through mounting base 12.

Figure 6:
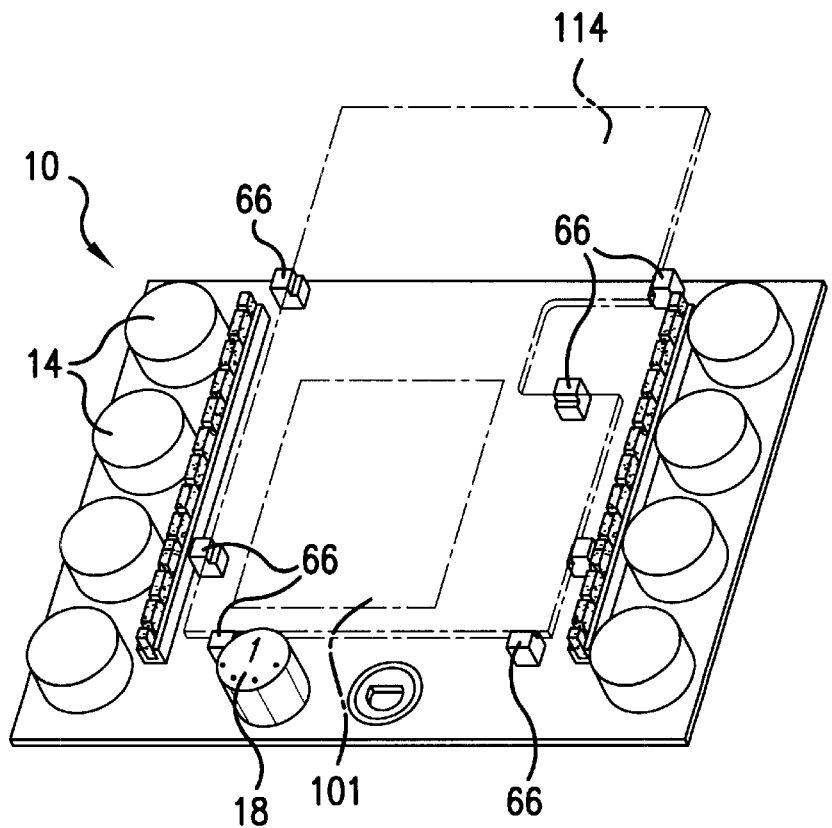
FIG. 6 is a perspective view of the apparatus for managing and measuring fiber optic cables shown in FIG. 1, and retaining a printed circuit board.

A variety of fiber cassettes may be utilized with apparatus 10 of the present invention. For example, the fiber cassette disclosed in U.S. Pat. No. 5,778,132, assigned to the assignee of the present application, CIENA Corporation, the disclosure of which being herein incorporated by reference, may be used with apparatus 10. The referenced patent is but one example of a fiber cassette that may be utilized with the invention. In general, a fiber cassette is any apparatus that retains optical components and routes optical fiber between such components. Fiber cassettes may also be mounted to a printed circuit board (PCB) 114 for integration with electronic components, as shown in FIG. 6. In either case, the mounting base 12 may be adapted to accept any type of fiber cassette whether or not the cassette is mounted on a printed circuit board or other apparatus. The term "fiber cassette" is being used in its broadest sense herein and includes an apparatus that retains optical components and routes fiber whether or not such apparatus is mounted to a PCB or other apparatus.

For example and as shown in FIG. 1, a cassette tray insert 100 for holding fiber cassette 101 may be provided approximately a middle portion of mounting base 12, but may be provided at other locations of base 12. Cassette tray insert 100 may be attached to mounting base 12 in a variety of ways, including but not limited to screws, nuts and bolts, glue, adhesive, rivets, pins, etc. Multiple optical components 102 may be mounted in fiber cassette 101, and the configuration of the fiber cassette 101 will depend upon the amount and type of optical components 102 secured therein. For example, apparatus 10 of the present invention may be used with any of the cassettes described above. FIG. 1 shows one type of fiber cassette 101 that may be used in the apparatus 10 of the present invention. Fiber cassette 101 may include a multitude of spaced ribs 106 for holding optical components 102 therebetween. For clarity purposes, FIG. 1 shows only one optical component 102 provided between ribs 106, although a plurality of optical components 102 may be provided between ribs 106 Furthermore, the number of ribs 106 may be increased or decreased over the amount shown in FIG. 1, depending upon the number of optical components 102 desired for a particular application.

Alternatively, as shown in FIG. 6, fiber cassette 101 may be provided on PCB 114, and the combination attached to mounting base 12. In this configuration, cassette tray insert 100 is replaced by a multitude of L-shaped support blocks 66 that receive and support PCB 114. Support blocks 66 may be attached to mounting base 12 in a variety of ways, including but not limited to screws, nuts and bolts, glue, adhesive, rivets, pins, etc. A heatsink may also be attached to PCB 114 to dissipate the heat generated by PCB 114.

Optical component 102 shown in FIG. 1 may have one or more fiber optic cables 104 emanating from both end portions thereof, or one end portion thereof, depending upon the type of optical component 102. Cassette tray insert 100 may also have a pair of resilient rails 108 on opposing sides of fiber cassette 101. Resilient rails 108 provide a soft surface for fiber optic cables 104 to prevent damage to cables 104 when they are routed away from fiber cassette 101. Resilient rails 108 also prevent the operator from pinching fiber optic cables 104 between fiber cassette 101 walls and cassette tray insert 100. Resilient rails 108 may be made from a variety of materials, including but not limited to soft rubber (natural or synthetic), an electrostatic discharge (ESD) preventing foam, elastomers, etc.

Fiber cassette 101 may be attached to cassette tray insert 100 with a variety of connection mechanisms. Preferably fiber cassette 101 easily connects and disconnects to and from cassette tray insert 100 so that different types of fiber cassettes can be easily utilized with apparatus 10. Thus, fiber cassette 101 may connect to cassette tray insert 100 with screws, nuts and bolts, double-sided tape, pins, etc.

As further shown in FIG. 1, the pair of fiber retainer rails 16 may be provided adjacent to fiber cassette 101 to guide fiberoptic cables 104 to fiber take up mandrels 14. Each fiber retainer rail 16 may comprise an elongated, channel-shaped mount post 22 that retains a resilient rail 24 therein. Mount posts 22 may be made from a variety of materials, but preferably are made from the same material making up mounting base 12. Mount posts 22 may connect to mounting base 12 in many ways, including but not limited to screws, nuts and bolds, adhesive, glue, rivets, etc.

Figure 3:
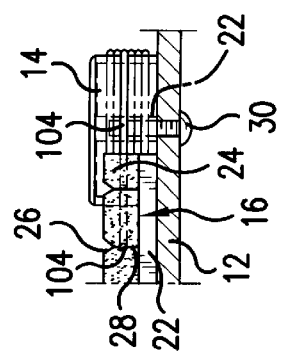
FIG. 3 is a side elevational view in partial cross-section of a take up mandrel and foam insert retainer of the apparatus for managing and measuring fiber optic cables shown in FIG. 1.

Resilient rails 24 comprise an elongated, continuous piece of resilient material that protects fiber optic cables 104 from damage. Resilient rails 24 may be made from a variety of materials, including but not limited to soft rubber (natural or synthetic), an electrostatic discharge (ESD) preventing foam, elastomers, etc. As best shown in FIG. 3, each resilient rail 24 has a plurality of V-notches 26 formed in its top surface. Each V-notch 26 communicates with a corresponding slit 28 formed in resilient rails 24. V-notches 26 enable an operator of apparatus 10 to easily guide fiber optic cables 104 into slits 28 of resilient rails 24, and slits 24 retain fiber optic cables 104 therein. V-notches 26 and slits enable management of, prevent entanglement of, and guide fiber optic cables 104 to adjacent take up mandrels 14 where they may be stored out of the way for future use. More or less V-notches 26 and slits 28 than shown in FIG. 1 may be provided, and the spacing of V-notches 26 and slits 28 may vary depending upon the application of apparatus 10.

Fiber take up mandrels 14 are provided to hold fiber optic cables 104 not being measured, spliced, cleaved, used, etc. out of the way of the operator. Fiber take up mandrels 14 may be cylindrical-shaped, and may have the same or different diameters, and hence circumferences, to accommodate different excess cable lengths. Other shapes of take up mandrels 14 are possible, including but not limited to elliptical, oval, etc. The circumferences of take up mandrels 14 may vary depending upon the optical component 102, where optical component 102 is to be mounted in a circuit, and the fiber optic cables 104. It is to be understood that these circumferences are application specific and depend upon the factors mentioned above.

Preferably, the circumferences of take up mandrels 14 prevent the optical fibers of cables wrapped around mandrels 14 from being bent beyond the minimum bend radius to operate within required performance specifications. The minimum bend radius of a fiber optic cable depends upon a variety of factors, including the signal handled by the fiber optic cable, the style of the fiber optic cable, and equipment to which to fiber optic cable is connected. For example, some fiber optic cables used for internal routing have a minimum bend radius of 0.75 inches, and some fiber optic cables used for external routing have a minimum bend radius of 1.0 inches.

Take up mandrels 14 may be integrally formed with mounting base 12. Preferably take up mandrels 14 easily connect and disconnect to and from base 12 so that fiber take up mandrels 14 having different circumferences can be easily utilized with apparatus 10. Thus, take up mandrels 14 may connect to mounting base 12 with screws 30 (as shown in FIG. 1 by way of example only), nuts and bolts, double-sided tape, pins, etc. Take up mandrels 14 may be made from a variety of materials, but preferable are made from stainless steel, and more preferable, an anodized aluminum. FIG. 1 shows how fiber optic cable 104 may be wrapped around a take up mandrel 14. Although the fiber optic cable 104 is shown being wrapped in a clockwise direction, it may also be wrapped in a counter-clockwise direction.

The loops formed by the fiber optic cables 104 wrapped around take up mandrels 14 may be retained in a variety of ways. For example, the loops of fiber optic cables 104 may be retained upon themselves (if wound correctly) or with conventional fastening means such as, for example: a silicon tube having a slice down one side to allow the loop to be cradled inside the tube, a tie strip as disclosed in U.S. Pat. No. 5,799,376, a tie wrap as also disclosed in U.S. Pat. No. 5,799,376, tape, etc.

Prior to mounting optical components 102 in fiber cassette 101, preferably fiberoptic cables 104 emanating from optical components 102 are scored and stripped of their buffer layers. For example, fiber optic cables 104 may be stripped using the precision linear stripper disclosed in U.S. Pat. No. 6,079,297 and discussed above. When the fiber optic cables 104 are stripped, the bare optical fibers of cables 104 are exposed on portions of cables 104.

Once fiber optic cables 104 are stripped, they need to be marked for splice points. Thus, the bare optical fiber of one fiber optic cable 104 is wrapped around either marking mandrel 18, 20, either in a clockwise or counter-clockwise direction, as shown in FIG. 1. Preferably, if the marking mandrel on the right (as shown in FIG. 1) is used, then fiber optic cable 104 is wrapped in a clockwise direction, and if the marking mandrel on the left is used, then cable 104 is wrapped in a counter-clockwise direction. Marking mandrels 18, 20 are interchangeable between the right and left sides of mounting base 12.

Figure 2:
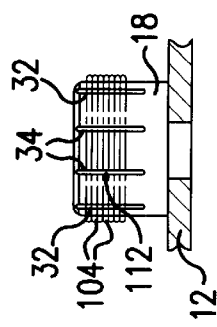
FIG. 2 is a side elevational view of a marking mandrel of the apparatus for managing and measuring fiber optic cables shown in FIG. 1.

Marking mandrels 18, 20 may be provided with a plurality marking grooves provided around their peripheries. The number and spacing of the marking grooves will depend upon the optical components 102 used with the present invention, the fiber cassette 101 configuration, and the type of fiber optic cables 104. Marking mandrels 18,20 are spaced a predetermined distance from the edge of fiber cassette 101 so that precise marking grooves may be provided on marking mandrels 18, 20. The predetermined distance will depend upon the optical components 102 used with the present invention, the fiber cassette 101 configuration, and the type of fiber optic cables 104. For example, as shown in FIGS. 1 and 2, marking mandrel 18 will have a pair of marking grooves 32 that are a distance A of four (4) centimeters from the edge of fiber cassette 101, when cable 104 engages the periphery of marking mandrel 18. Likewise, marking mandrel 18 may also have another pair of marking grooves 34 that are six (6) centimeters from the edge of fiber cassette 101, when cable 104 engages the periphery of marking mandrel 18. By way of example only, marking mandrel 20 may have a pair of marking grooves 36 that are 3.5 centimeters from the edge of fiber cassette 101, and another pair of marking grooves 38 that are five (5) centimeters from the edge of fiber cassette 101, when cable 104 engages the periphery of marking mandrel 20.

Marking mandrels 18, 20 may be cylindrical-shaped and may have different diameters, and hence circumferences, to accommodate different fiber optic cable types. Other shapes of marking mandrels 18, 20 are possible, including but not limited to elliptical, oval, etc. The circumferences of marking mandrels 18, 20 will vary depending upon the optical components 102 used with the present invention, the fiber cassette 101 configuration, and the type of fiber optic cables 104.

By way of example only and as shown in the Figures, marking mandrel 18 may have a circumference of approximately thirteen (13) centimeters, and marking mandrel 20 may have a circumference of approximately eleven (11) centimeters. Preferably, the circumferences of marking mandrels 18, 20 are large enough to prevent the optical fibers of cables wrapped around mandrels 18, 20 from being bent beyond the minimum bend radius to operate within required performance specifications.

Furthermore, more than four marking grooves may be provided around the circumference of marking mandrels 18, 20 to accommodate a variety of optical components and fiber optic cables. The number and location of grooves will depend upon the factors mentioned above so as to locate splice points on the fiber optic cables 104. Once a fiber optic cable 104 is wrapped around a marking mandrel 18, 20, an operator may mark cable 104 with a marking device 110, such as for example, a pen, marker, etc. The number of marks 112 on cable 102 will depend upon the number of times cable 104 is wrapped around mandrel 18, 20, and whether cable 104 is marked at multiple marking grooves.

Marking mandrels 18, 20 may be integrally formed with mounting base 12, but preferably connect to and disconnect from base 12 so that marking mandrels having different circumferences can be easily utilized with apparatus 10. Thus, marking mandrels 18, 20 may connect to base 12 with screws, nuts and bolts, double-sided tape, pins, etc. Marking mandrels 18, 20 may be made from a variety of materials, but preferably are made from stainless steel, and more preferably, an anodized aluminum.

Figure 5:
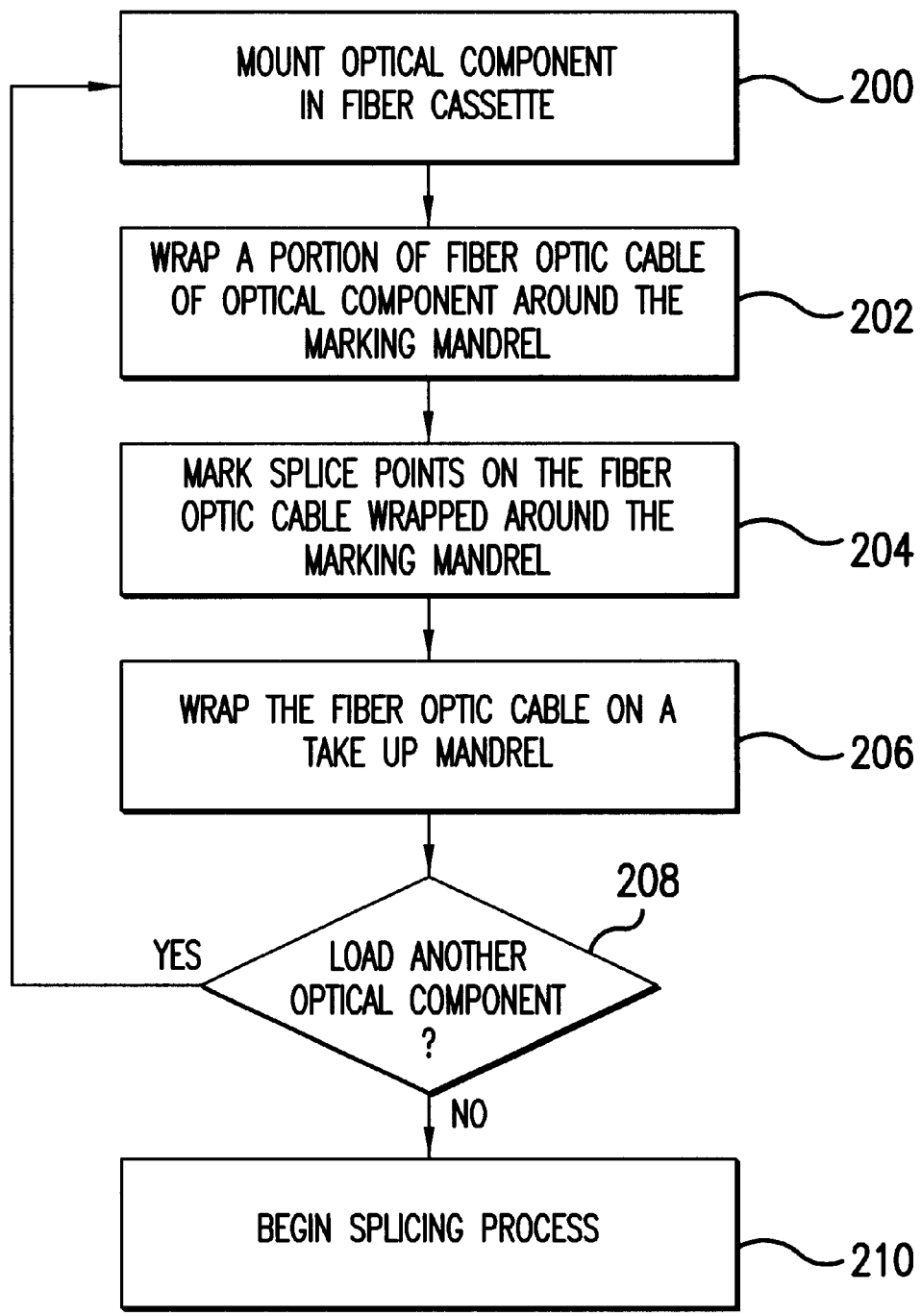
FIG. 5 is a flow chart showing a method for managing and measuring fiber optic cables using the apparatus shown in FIG. 1.

Although the method of managing and measuring fiber optic cables has been described above with reference to apparatus 10, a step-by-step description of the method will be described with reference to FIG. 5. The method begins at step 200, where the operator mounts an optical component 102 in fiber cassette 101. The operator, at step 202, brings the fiber optic cable 104 emanating from optical component 102 to the edge of fiber cassette 101, and wraps it around a marking mandrel 18, 20. At step 204, the operator uses marker 110 to mark splice points on fiber optic cable 104. This places multiple marks 112 (dependent upon the number of times cable 104 is wrapped around mandrel 18, 20) on cable 104 a predetermined distance from the edge of fiber cassette 101. The marked fiber optic cable 104 may subsequently be cleaved at one of the marks and spliced to another fiber optic cable. If the cleave or splice of the marked cable 104 fails, the operator may easily cleave cable 104 at the next mark on cable 104 and attempt the splicing operation again.

Once the operator marked all of the fiber optic cables 104 emanating from optical component 102, the operator will then wrap the fiber optic cables 104 around take up mandrels 14, as shown at step 206. This way cables 104 which have been marked and are not being processed by the operator may be stored out of the way of the operator for future processing. Such fiber management prevents a web of cables from forming that may confuse the operator charged with the task of splicing optical components together. Thus, take up mandrels 14 help manage loose fiber optic cable ends and prevent the operator from incorrectly splicing two optical components together, preventing damage or destruction to the optical components.

At step 208, the operator determines if another optical component 102 needs to be loaded in fiber cassette 101. If another optical component 102 is to be loaded in fiber cassette 101, then steps 202, 204, and 206 are repeated for another optical component(s). After all of the required optical components 102 are loaded in fiber cassette 101, the operator begins the splicing operation at step 210. At step 210, the operator will take fiber optic cables 104 from two optical components 102, cut, cleave, and clean the cables 104, and splice them together. This process is continued until all of the optical components 102 are spliced together as prescribed by the circuit arrangement. Alternatively, fiber cassette 101 may be loaded with optical components 102 prior to insertion of fiber cassette 101 on mounting base 12. Such an arrangement is not preferred, however, since a loaded fiber cassette 101 will likely have a confusing web of fiber optic cables 104 that the operator will need to sort through once the cassette 101 is loaded on mounting base 12.

The apparatus 10 of the present invention provides a compact arrangement that allows fiber management and measurement during the assembly of multiple components. The apparatus 10 also keeps the optical components and their cables off the surface of the workbench where the fiber optic cables are susceptible to being pinched, crushed, or damaged. The apparatus 10 of the present invention eliminates the need to measure predetermined splice marks with a ruler, and enables multiple, evenly-spaced splice marks to be made with the stroke of a pen. The apparatus 10 also prevents fiber optic cables 104 from becoming entangled and potentially damaged during the assembly operation.

It will be apparent to those skilled in the art that various modifications and variations can be made in the apparatus for managing and measuring fiber optic cables and method of the present invention and in construction of the apparatus and method without departing from the scope or spirit of the invention. As an example, the material selections and dimensions discussed above are purely exemplary and not limiting of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for managing and measuring fiber optic cable, comprising:

a mounting base for receiving and retaining a fiber cassette capable of holding at least one optical component having at least one fiber optic cable emanating therefrom;

a fiber take up mandrel connected to said mounting base and having a circumference that exceeds the minimum bend radius of the fiber optic cable, wherein the fiber optic cable may be wound around the circumference of said fiber take up mandrel for temporary storage thereon;

a fiber retainer rail connected to said mounting base and interposed between the fiber cassette and said fiber take up mandrel, said fiber retainer rail guiding the fiber optic cable from the fiber cassette to said fiber take up mandrel; and a marking mandrel spaced from the fiber cassette and having a circumference that exceeds the minimum bend radius of the fiber optic cable, said marking mandrel having a marking groove formed on its periphery so that the fiber optic cable may be marked at a predetermined location.

2. An apparatus for managing and measuring fiber optic cable as recited in claim 1, wherein said marking mandrel has a plurality of marking grooves formed on its periphery so that the fiber optic cable may be marked at a plurality of predetermined locations.

3. An apparatus for managing and measuring fiber optic cable as recited in claim 1, wherein said marking mandrel has a two pairs of marking grooves, each pair of marking grooves being located the same distance from the edge of the fiber cassette.

4. An apparatus for managing and measuring fiber optic cable as recited in claim 1, wherein said marking mandrel is removably connected to said mounting base.

5. An apparatus for managing and measuring fiber optic cable as recited in claim 1, wherein said fiber take up mandrel is removably connected to said mounting base.

6. An apparatus for managing and measuring fiber optic cable as recited in claim 1, wherein said marking mandrel is a first marking mandrel and the apparatus further comprises a second marking mandrel having a circumference that exceeds the minimum bend radius of the fiber optic cable and a marking groove formed on its periphery so that the fiber optic cable may be marked at a predetermined location.

7. An apparatus for managing and measuring fiber optic cable as recited in claim 6, wherein said first marking mandrel is interchangeable with said second marking mandrel.

8. An apparatus for managing and measuring fiber optic cable as recited in claim 6, wherein the fiber optic cable is wrapped around the periphery of one of the first marking mandrel or the second marking mandrel.

9. An apparatus for managing and measuring fiber optic cable as recited in claim 1, wherein the optical component is selected from the group consisting of an optical amplifier, an optical emitter, and an optical detector.

10. An apparatus for managing and measuring fiber optic cable as recited in claim 1, wherein a plurality of fiber take up mandrels are connected to said mounting base, each fiber take up mandrel having a circumference that exceeds the minimum bend radius of the fiber optic cable, and the fiber optic cable may be wound around the circumferences of each of said plurality of fiber take up mandrels for storage thereon.

11. An apparatus for managing and measuring fiber optic cable as recited in claim 1, wherein a plurality of fiber retainer rails are connected to said mounting base and interposed between the fiber cassette and said fiber take up mandrel, each of said plurality of fiber retainer rails guiding the fiber optic cable from the fiber cassette to said fiber take up mandrel.

12. An apparatus for managing and measuring fiber optic cable as recited in claim 1, wherein said fiber retainer rail comprises an elongated, channel-shaped mount post that retains a resilient rail therein.

13. An apparatus for managing and measuring fiber optic cable as recited in claim 12, wherein the resilient rail of said fiber retainer rail comprises an elongated piece of resilient material that protects the fiber optic cable from damage.

14. An apparatus for managing and measuring fiber optic cable as recited in claim 13, the resilient material is selected from the group consisting of a soft natural rubber, a soft synthetic rubber, an electrostatic discharge preventing foam, and elastomers.

15. An apparatus for managing and measuring fiber optic cable as recited in claim 13, wherein the resilient rail has a plurality of V-notches formed in its top surface, each V-notch communicating with a corresponding slit formed in the resilient rail, and each of the plurality of V-notches and slits guide and retain the fiber optic cable therein.

16. An apparatus for managing and measuring fiber optic cable as recited in claim 1, further comprising an articulating arm assembly connected to said mounting base, said articulating arm assembly enabling the apparatus to be moved to a plurality of locations.

17. An apparatus for managing and measuring fiber optic cable as recited in claim 1, wherein the fiber cassette has rails made from an electrostatic discharge preventing material, the fiber cassette rails protecting the fiber optic cable from damage.

18. An apparatus for managing and measuring fiber optic cable, comprising:
   a mounting base for receiving and retaining a fiber cassette capable of holding a plurality of optical components, each optical component having at least one fiber optic cable emanating therefrom;
   a plurality of fiber take up mandrels connected to said mounting base, each fiber take up mandrel having a circumference that exceeds the minimum bend radius of the fiber optic cables, wherein the fiber optic cables may be wound around the circumference of each fiber take up mandrel for temporary storage thereon;
   a fiber retainer rail connected to said mounting base, said fiber retainer rail being interposed between the fiber cassette and one of said plurality of fiber take up mandrels, said fiber retainer rail guiding the fiber optic cables from the fiber cassette to one of said plurality of fiber take up mandrels; and
   a marking mandrel spaced from the fiber cassette, said marking mandrel having a circumference that exceeds the minimum bend radius of the fiber optic cables and having a marking groove formed on the periphery so that the fiber optic cables may be marked at predetermined locations.

19. An apparatus for managing and measuring fiber optic cable as recited in claim 18, wherein a plurality of fiber retainer rails are connected to said mounting base, each fiber retainer rail being interposed between the fiber cassette and one of said plurality of fiber take up mandrels, each fiber retainer rail guiding the fiber optic cables from the fiber cassette to one of said plurality of fiber take up mandrels.

20. An apparatus for managing and measuring fiber optic cable as recited in claim 18, wherein a plurality of marking mandrels are spaced from the fiber cassette, each marking mandrel having a circumference that exceeds the minimum bend radius of the fiber optic cables and having a marking groove formed on the periphery so that the fiber optic cables may be marked at predetermined locations.

21. A method for managing and measuring a fiber optic cable with an apparatus having a mounting base for receiving and retaining a fiber cassette, a fiber take up mandrel connected to the mounting base and having a circumference that exceeds the minimum bend radius of a fiber optic cable, a fiber retainer rail connected to the mounting base and interposed between the fiber cassette and the fiber take up mandrel, and a marking mandrel spaced from the fiber cassette and having a circumference that exceeds the minimum bend radius of the fiber optic cable, comprising:
   mounting an optical component having at least one fiber optic cable emanating therefrom in the fiber cassette;
   wrapping a portion of the fiber optic cable around the marking mandrel;
   marking a predetermined location of the fiber optic cable using a marking groove formed on the periphery of the marking mandrel; and
   wrapping the marked fiber optic cable on the fiber take up mandrel for temporary storage thereon.

22. A method for managing and measuring a fiber optic cable as recited in claim 21, wherein the apparatus comprises a plurality of fiber take up mandrels connected to the mounting base, each fiber take up mandrel having a circumference that exceeds the minimum bend radius of the fiber optic cable, further comprising:
   mounting plural optical components in the fiber cassette, each optical component having at least one fiber optic cable emanating therefrom;

repeating the wrapping around the marking mandrel step and the marking step for each fiber optic cable; and wrapping the each marked fiber optic cable on a corresponding one of the plurality of fiber take up mandrels for temporary storage thereon.

23. A method for managing and measuring a fiber optic cable as recited in claim 21, wherein the marking mandrel comprises a first marking mandrel, the apparatus further has a second marking mandrel having a circumference that exceeds the minimum bend radius of the fiber optic cable, and the marking step comprises marking a predetermined location of the fiber optic cable using a marking groove formed on the periphery of one of the first or second marking mandrels.

24. A method for managing and measuring a fiber optic cable as recited in claim 21, further comprising:

cleaving a pair of fiber optic cables at the predetermined locations marked on the fiber optic cables;

splicing together the pair of fiber optic cables; and repeating the previous two steps if another pair of fiber optic cables need to be connected.

\* \* \* \* \*